US012537309B2

(12) United States Patent
Huang et al.

(10) Patent No.: US 12,537,309 B2
(45) Date of Patent: Jan. 27, 2026

(54) ANTENNA STRUCTURE AND ANTENNA ARRAY

(71) Applicant: PEGATRON CORPORATION, Taipei (TW)

(72) Inventors: Chin-Ting Huang, Taipei (TW); Chun-Kai Wang, Taipei (TW); Hsi-Kai Hung, Taipei (TW); Chih-Hui Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 76 days.

(21) Appl. No.: 18/596,628

(22) Filed: Mar. 6, 2024

(65) Prior Publication Data

US 2024/0388001 A1 Nov. 21, 2024

(30) Foreign Application Priority Data

May 15, 2023 (TW) ................................ 112117891

(51) Int. Cl.
*H01Q 13/08* (2006.01)
*H01Q 21/06* (2006.01)

(52) U.S. Cl.
CPC ........... *H01Q 13/08* (2013.01); *H01Q 21/061* (2013.01)

(58) Field of Classification Search
CPC .... H01Q 13/08; H01Q 13/085; H01Q 13/106; H01Q 21/061; H01Q 21/065; H01Q 21/22; H01Q 21/24; H01Q 9/00; H01Q 9/045; H01Q 9/0407; H01Q 9/0428
See application file for complete search history.

(56) References Cited

U.S. PATENT DOCUMENTS

| | | | | |
|---|---|---|---|---|
| 5,043,738 A * | 8/1991 | Shapiro | H01Q 9/0457 | 343/700 MS |
| 5,241,321 A * | 8/1993 | Tsao | H01Q 9/0442 | 343/848 |
| 2014/0253400 A1* | 9/2014 | Tiezzi | H01Q 21/065 | 343/770 |
| 2016/0094091 A1* | 3/2016 | Shin | H01Q 1/248 | 307/104 |
| 2023/0378652 A1* | 11/2023 | Jiang | H01Q 21/065 | |

FOREIGN PATENT DOCUMENTS

CN 216354792 4/2022

* cited by examiner

*Primary Examiner* — Thai Pham
(74) *Attorney, Agent, or Firm* — J.C. PATENTS

(57) ABSTRACT

An antenna structure including a first grounding layer, a microstrip line group, a first conductive layer, a first radiator and a second radiator is provided. The microstrip line group is disposed above the first grounding layer and includes a first microstrip line and a second microstrip line perpendicular to each other. The first microstrip line includes a first feeding end. The second microstrip line includes a second feeding end. The first conductive layer is disposed above the microstrip line group and includes a first slot and a second slot perpendicular to each other. The first slot and the second slot correspond to the first microstrip line and the second microstrip line respectively. The first radiator is disposed above the first slot and the second slot. The second radiator is disposed above the first radiator.

13 Claims, 7 Drawing Sheets

ANTENNA STRUCTURE AND ANTENNA ARRAY

CROSS-REFERENCE TO RELATED APPLICATION

This application claims the priority benefit of Taiwan application serial no. 112117891, filed on May 15, 2023. The entirety of the above-mentioned patent application is hereby incorporated by reference herein and made a part of specification.

BACKGROUND

Technical Field

The invention relates to an antenna structure and an antenna array, and particularly relates to an antenna structure and an antenna array with a circularly polarized antenna framework.

Description of Related Art

Along with development of science and technology, users' requirements on performance of communication transmission have increased accordingly. Since a circularly polarized antenna is less affected by an external environment in a process of transmitting and receiving electromagnetic waves, and a receiving performance thereof is less limited by an installation orientation of a transceiver antenna, the application of the circularly polarized antenna is becoming increasingly widespread. How to design an antenna that may produce a good circularly polarized operating mode is one of the research goals of those skilled in the art.

SUMMARY

The invention is directed to an antenna structure, which is adapted to generate a left-hand circularly polarized operation mode and a right-hand circularly polarized operation mode, and both operation modes have good performance.

The invention provides an antenna structure including a first grounding layer, a microstrip line group, a first conducting layer, a first radiator and a second radiator. The microstrip line group is disposed above the first grounding layer and includes a first microstrip line and a second microstrip line that are perpendicular to each other. The first microstrip line includes a first feeding end. The second microstrip line includes a second feeding end. The first conducting layer is disposed above the microstrip line group and includes a first slot and a second slot that are perpendicular to each other. The first slot and the second slot correspond to the first microstrip line and the second microstrip line respectively. A main extending direction of the first slot is perpendicular to an extending direction of the first microstrip line. A main extending direction of the second slot is perpendicular to an extending direction of the second microstrip line. The first radiator is disposed above the first slot and the second slot. The second radiator is disposed above the first radiator. When the first feeding end is fed with a signal of a first phase, the second feeding end is fed with a signal of a second phase, and a phase difference between the first phase and the second phase is 90 degrees, first electromagnetic energy is coupled to the first slot and the second slot respectively through the first microstrip line and the second microstrip line, and then to the first radiator so as to generate a first frequency band of a left-hand circularly polarized operating mode. When the first feeding end is fed with the signal of the second phase and the second feeding end is fed with the signal of the first phase, second electromagnetic energy is coupled to the first slot and the second slot respectively through the first microstrip line and the second microstrip line, and then to the second radiator so as to generate a second frequency band of a right-hand circularly polarized operating mode.

In an embodiment of the invention, the first radiator and the second radiator are two round shapes, a diameter of the first radiator is a one-half wavelength of the first frequency band, and a diameter of the second radiator is a one-half wavelength of the second frequency band.

In an embodiment of the invention, each of the first radiator and the second radiator is a round shape, an elliptical shape or a polygonal shape, and a size of the second radiator is larger than that of the first radiator.

In an embodiment of the invention, each of the first slot and the second slot includes a main slot and two branch slots extending from two opposite ends of the main slot, and each branch slot is in a V-shape, and a tip of the V-shape is connected to the main slot.

In an embodiment of the invention, a perimeter of each of the first slot and the second slot is an integer multiple of a one-half wavelength of the first frequency band or the second frequency band.

In an embodiment of the invention, the antenna structure further includes a second conducting layer coplanar with the microstrip line group, the second conducting layer includes a first hollow region, the microstrip line group is located in the first hollow region, and a perimeter of the first hollow region is an integer multiple of a one-half wavelength of the first frequency band or the second frequency band.

In an embodiment of the invention, the first grounding layer, the second conducting layer and the first conducting layer are connected to each other through an inner ring conductive via group, the inner ring conductive via group is located at a periphery of the first hollow region and surrounds the first slot and the second slot.

In an embodiment of the invention, the first grounding layer, the second conducting layer and the first conducting layer are connected to each other through an outer ring conductive via group, the outer ring conductive via group is located at edges of the first grounding layer, the second conducting layer and the first conducting layer.

In an embodiment of the invention, a side length of each of the first grounding layer, the second conducting layer and the first conducting layer is less than the one-half wavelength of the first frequency band.

In an embodiment of the invention, the antenna structure further includes a third conducting layer located between the second conducting layer and the first conducting layer, the third conducting layer includes a second hollow region corresponding to the first hollow region, and a perimeter of the second hollow region is an integer multiple of the one-half wavelength of the first frequency band or the second frequency band.

In an embodiment of the invention, each of the first hollow region and the second hollow region includes a first portion and a second portion perpendicular to each other and presenting a T-shape, the first microstrip line is located in the first portion of the first hollow region, and the second microstrip line is located in the second portion of the first hollow region, the extending direction of the first microstrip line is perpendicular to an extending direction of the first portion, and the extending direction of the second microstrip line is perpendicular to an extending direction of the second portion.

In an embodiment of the invention, the antenna structure further includes a second grounding layer, and the first grounding layer is located between the second grounding layer and the microstrip line group.

In an embodiment of the invention, the first frequency band is between 14 GHz and 14.5 GHz, and the second frequency band is between 10.7 GHz and 12.7 GHz.

The invention provides an antenna array having a plurality of the aforementioned antenna structures arranged in an array.

Based on the above descriptions, the first slot and the second slot of the antenna structure of the invention correspond to the first microstrip line and the second microstrip line, the main extending direction of the first slot is perpendicular to the extending direction of the first microstrip line. The main extending direction of the second slot is perpendicular to the extending direction of the second microstrip line. When the first feeding end and the second feeding end are respectively fed with signals of the first phase and the second phase, and the phase difference between the first phase and the second phase is 90 degrees, the first electromagnetic energy is coupled to the first slot and the second slot respectively through the first microstrip line and the second microstrip line, and then to the first radiator so as to generate the first frequency band of the left-hand circularly polarized operating mode. When the first feeding end and the second feeding end are fed with signals of the second phase and the first phase respectively, the second electromagnetic energy is coupled to the first slot and the second slot respectively through the first microstrip line and the second microstrip line, and then to the second radiator so as to generate the second frequency band of the right-hand circularly polarized operating mode. Through such design, the antenna structure of the invention may provide good circular polarization performance and may be applied to low-orbit satellite communications.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
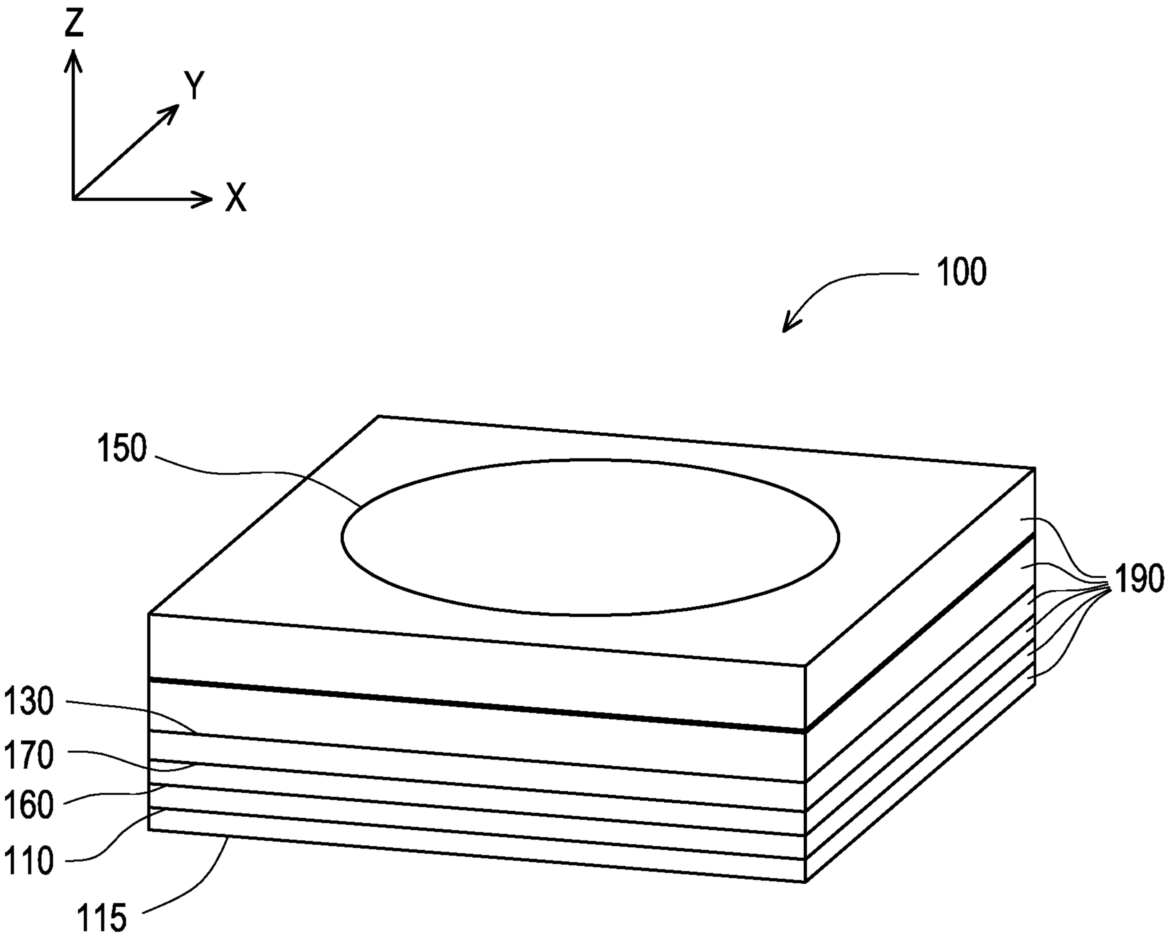
FIG. 1 is a schematic diagram of an antenna structure according to an embodiment of the invention.
Figure 2:
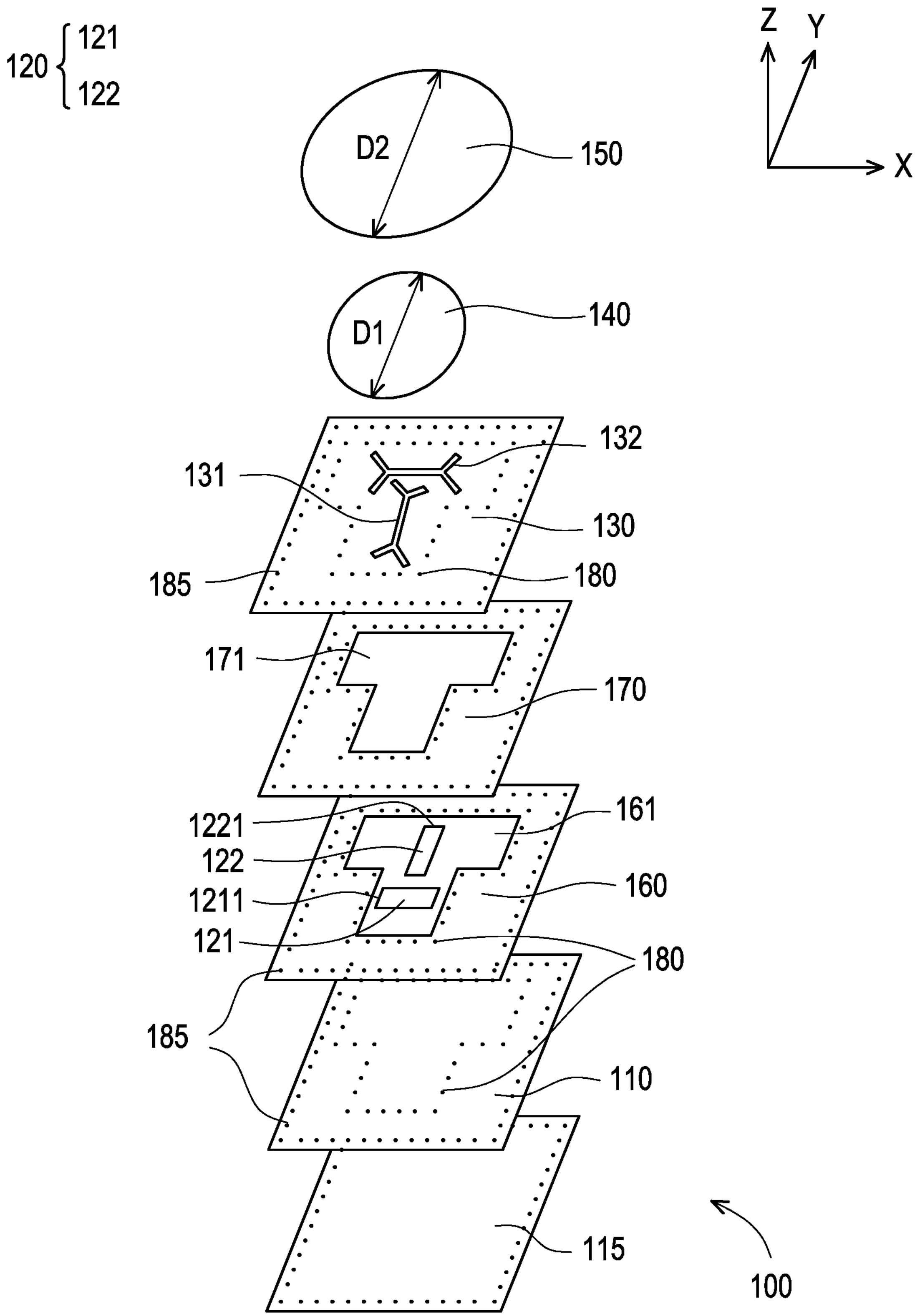
FIG. 2 is a schematic exploded view of the antenna structure of FIG. 1.

FIG. 1 is a schematic diagram of an antenna structure according to an embodiment of the invention. FIG. 2 is a schematic exploded view of the antenna structure of FIG. 1. It should be noted that, in order to keep the drawing simple, the insulating layers 190 are not shown in FIG. 2. In addition, in FIG. 1, a first radiator 140 is located between the uppermost insulating layer 190 and a second-tier insulating layer 190 counting from top to bottom. The uppermost referred to here is an upper side of the drawing in FIG. 1.

Referring to FIG. 1 and FIG. 2, the antenna structure 100 of the embodiment includes a first grounding layer 110, a microstrip line group 120 (i.e., 121, 122 as shown in FIG. 2) and a first conducting layer 130. The microstrip line group 120 is, for example, made of metal, and is located above the first grounding layer 110. The first conducting layer 130 is located above the microstrip line group 120.

To be specific, the antenna structure 100 of the embodiment further includes a second conducting layer 160 coplanar with the microstrip line group 120, and the second conducting layer 160 includes a first hollow region 161. The microstrip line group 120 is located in the first hollow region 161. In other words, the second conducting layer 160 of the embodiment is located between the first conducting layer 130 and the first grounding layer 110, and the microstrip line group 120 is located in the first hollow region 161 of the second conducting layer 160.

In the embodiment, the microstrip line group 120 includes a first microstrip line 121 and a second microstrip line 122 that are perpendicular to each other. The first microstrip line 121 includes a first feeding end 1211, and the second microstrip line 122 includes a second feeding end 1221.

In addition, the first conducting layer 130 includes a first slot 131 and a second slot 132 that are perpendicular to each other. The first slot 131 and the second slot 132 respectively correspond to the first microstrip line 121 and the second microstrip line 122. A main extending direction of the first slot 131 is perpendicular to an extending direction of the first microstrip line 121, and a main extending direction of the second slot 132 is perpendicular to an extending direction of the second microstrip line 122.

Figure 3:
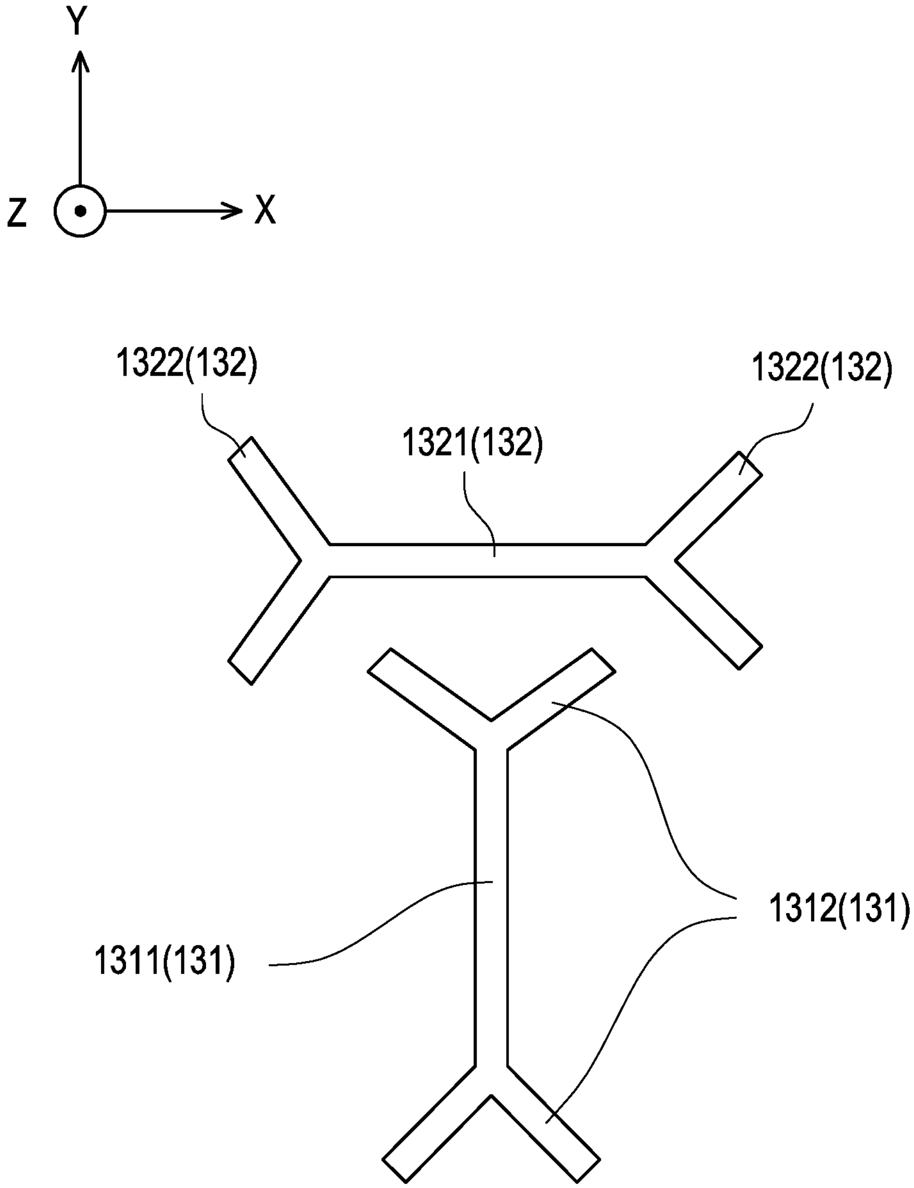
FIG. 3 is a schematic diagram of a microstrip line group of the antenna structure of FIG. 2.

To be specific, FIG. 3 is a schematic diagram of the microstrip line group of the antenna structure of FIG. 2. Specifically, referring to FIG. 3, each of the first slot 131 and the second slot 132 includes a main slot 1311 or 1321 and two branch slots 1312 or 1322 extending from two opposite ends of the main slot 1311 or 1321. Each branch slot 1312 or 1322 is in a V-shape, and a tip of the V-shape is connected to the main slot 1311 or 1321.

The main extending direction (Y-axis direction) of the main slot 1311 of the first slot 131 (FIG. 3) is perpendicular to the extending direction (X-axis direction) of the first microstrip line 121 (FIG. 2). The main extending direction (X-axis direction) of the main slot 1321 of the second slot 132 (FIG. 3) is perpendicular to the extending direction (Y-axis direction) of the second microstrip line 122 (FIG. 2).

In addition, the antenna structure 100 of the embodiment includes a first radiator 140 (FIG. 2) and a second radiator 150. The first radiator 140 is located above the first slot 131 and the second slot 132, and the second radiator 150 is located above the first radiator 140.

When the first feeding end 1211 is fed with a signal of a first phase, the second feeding end 1221 is fed with a signal of a second phase, and a phase difference between the first phase and the second phase is 90 degrees, first electromagnetic energy is coupled to the first slot 131 and the second slot 132 respectively through the first microstrip line 121 and the second microstrip line 122, and then coupled to the first radiator 140 so as to generate a first frequency band of a left-hand circularly polarized operating mode. The first phase is, for example, a phase zero, and the second phase is, for example, a phase 90 degrees. The first frequency band is, for example, between 14 GHz and 14.5 GHz, and is a transmission signal (Tx).

In addition, when the first feeding end 1211 is fed with the signal of the second phase and the second feeding end 1221 is fed with the signal of the first phase, second electromagnetic energy is coupled to the first slot 131 and the second slot 132 respectively through the first microstrip line 121 and the second microstrip line 122, and then coupled to the second radiator 150 so as to generate a second frequency band of a right-hand circularly polarized operating mode. The second frequency band is, for example, between 10.7 GHz and 12.7 GHz, and is a receiving signal (Rx).

Through the above design, the antenna structure 100 of the embodiment may generate the first frequency band of the left-hand circularly polarized operating mode and the second frequency band of the right-hand circularly polarized operating mode. In addition, both of the first frequency band and the second frequency band fall within frequency bands of low-orbit satellite communication specifications. Therefore, the antenna structure 100 of the embodiment is a circularly polarized antenna applicable to low-orbit satellites.

It should be noted that, referring to FIG. 2, a diameter D1 of the first radiator 140 is a one-half wavelength of the first frequency band, a diameter D2 of the second radiator 150 is a one-half wavelength of the second frequency band, and a size of the second radiator 150 is larger than that of the first radiator 140. Namely, the diameter D2 of the second radiator 150 is larger than the diameter D1 of the first radiator 140. Through such design, the antenna structure 100 of the embodiment may excite the first frequency band and the second frequency band.

The appearance of the first radiator 140 and the second radiator 150 in the embodiment is, for example, two round shapes. After simulation, when the appearance of the first radiator 140 and the second radiator 150 is designed to be circular, the performance of the antenna efficiency is optimal, but in other embodiments, each of the first radiator 140 and the second radiator 150 may also be in an elliptical shape or a polygonal shape, which is not limited by the invention.

In addition, a side length of each of the first grounding layer 110, the second conducting layer 160 and the first conducting layer 130 of the embodiment needs to be less than the one-half wavelength of the first frequency band. Specifically, the side length of each of the first grounding layer 110, the second conducting layer 160 and the first conducting layer 130 needs to be less than a one-half wavelength of the highest frequency of the operating mode of the antenna structure 100, which is helpful for the antenna structure 100 of the embodiment to excite the first frequency band and the second frequency band.

A perimeter of each of the first slot 131 and the second slot 132 of the embodiment is an integer multiple of the one-half wavelength of the first frequency band or the second frequency band, and a perimeter of the first hollow region 161 (FIG. 2) of the second conducting layer 160 is an integer multiple of the one-half wavelength of the first frequency band or the second frequency band. Through such design, the efficiency of the antenna structure 100 may be optimized. In addition, an included angle between the extending directions of the branch slot 1312 or 1322 and the corresponding main slot 1311 or 1321 is, for example, 45 degrees, so that better axial ratio characteristics may be obtained. Lengths and widths of the main slots 1311 and 1321 and the branch slots 1312 and 1322 may be adjusted according to an impedance requirement.

Referring to FIG. 2 again, in the embodiment, the first grounding layer 110, the second conducting layer 160 and the first conducting layer 130 are electrically connected to each other through an inner ring conductive via group 180 and an outer ring conductive via group 185. The inner ring conductive via group 180 is located on a periphery of the first hollow region 161 and surrounds the first slot 131 and the second slot 132. The outer ring conductive via group 185 is located at edges of the first grounding layer 110, the second conducting layer 160 and the first conducting layer 130.

In detail, a base band (BB) circuit and a radio frequency (RF) circuit may be provided on the first grounding layer 110, the second conducting layer 160 and the first conducting layer 130 at a hollow portion between the inner ring conductive via group 180 and the outer ring conductive via group 185, and additional circuit lines are connected to the first feeding end 1211 and the second feeding end 1221. The inner ring conductive via group 180 may prevent signals generated by the BB circuit and the RF circuit from interfering with a coupling effect between the first microstrip line 121 and the first slot 131 and a coupling effect between the second microstrip line 122 and the second slot 132. The outer ring conductive via group 185 may prevent interferences of signals from other antenna structures 100 or signals from other electronic products.

The antenna structure 100 of the embodiment further includes a second grounding layer 115. The first grounding layer 110 is located between the second grounding layer 115 and the microstrip line group 120. The second grounding layer 115 is also provided with the outer ring conductive via group 185 to prevent interference of signals from other antenna structures 100 or signals from other electronic products.

Figure 4:
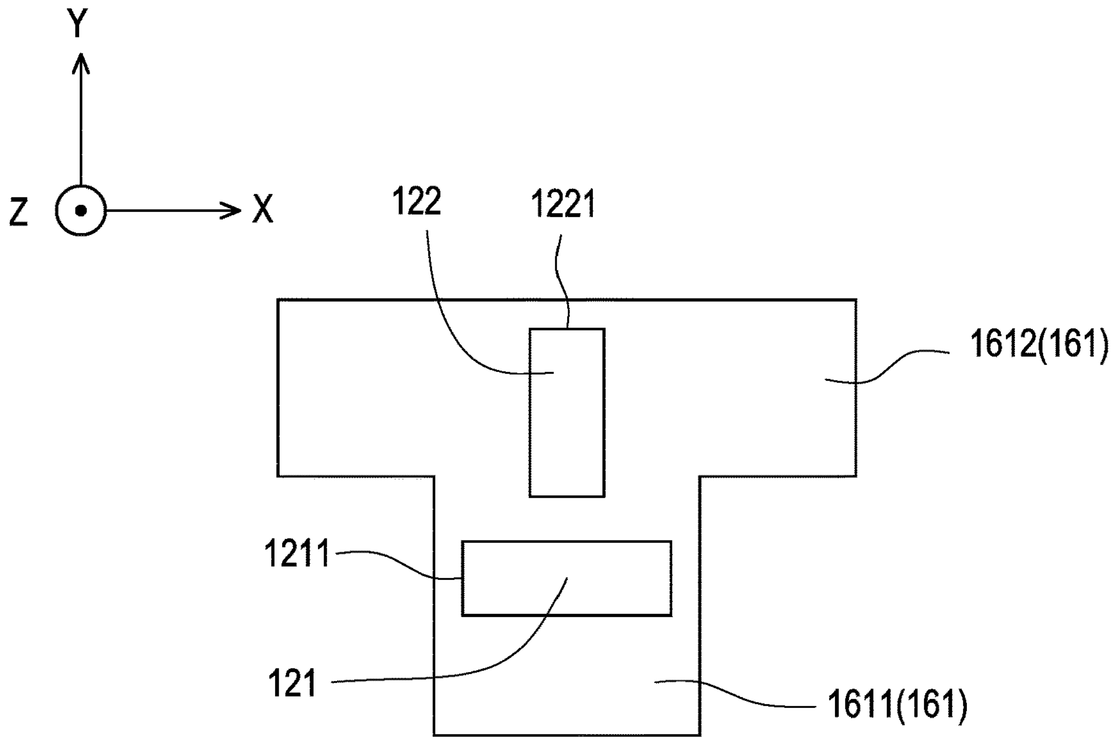
FIG. 4 is a schematic diagram of a first hollow region of the antenna structure of FIG. 2.
Figure 5:
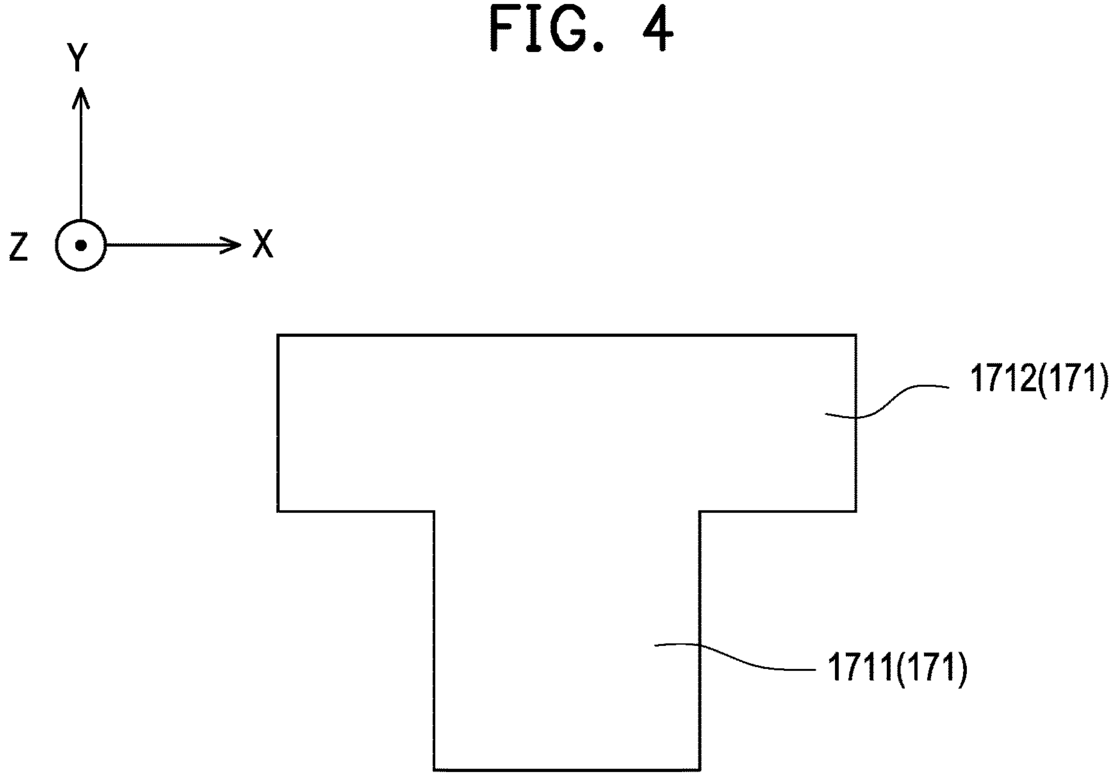
FIG. 5 is a schematic diagram of a second hollow region of the antenna structure of FIG. 2.

FIG. 4 is a schematic diagram of the first hollow region of the antenna structure of FIG. 2. FIG. 5 is a schematic diagram of a second hollow region of the antenna structure of FIG. 2. Referring to FIG. 2, FIG. 4 and FIG. 5, the antenna structure 100 of the embodiment further includes a third conducting layer 170 located between the second conducting layer 160 and the first conducting layer 130. The third conducting layer 170 includes a second hollow region 171 corresponding to the first hollow region 161, and a perimeter of the second hollow region 171 is also an integer multiple of the one-half wavelength of the first frequency band or the second frequency band.

Furthermore, each of the first hollow region 161 and the second hollow region 171 includes a first portion 1611, 1711 and a second portion 1612, 1712 that are perpendicular to each other. Each of the first hollow region 161 and the second hollow region 171 is in a T-shape. The first microstrip line 121 is located in the first portion 1611 of the first hollow region 161, and the second microstrip line 122 is located in the second portion 1612 of the first hollow region 161. The extending direction (X-axis direction) of the first microstrip line 121 is perpendicular to the extending direction (Y-axis direction) of the first portions 1611 and 1711, and the extending direction (Y-axis direction) of the second microstrip line 122 is perpendicular to the extending direction of the second portions 1612 and 1712.

It should be added that the first hollow region 161 and the second hollow region 171 of the embodiment have a T-shape appearance, which may achieve a better antenna effect. However, in other embodiments, a rectangular or square appearance may also be presented, which is not limited by the invention. In addition, the third conducting layer 170 is also provided with the inner ring conductive via group 180 and the outer ring conductive via group 185 to prevent interference from signals generated by the BB circuit and RF circuit and other antenna signals.

In addition, referring back to FIG. 1, the insulating layers 190 are provided between the second grounding layer 115, the first grounding layer 110, the second conducting layer 160, the third conducting layer 170, the first conducting layer 130, the first radiator 140 and the second radiator 150, and circuits passing through the insulating layers 190 may be provided between the layers to implement electrical connection of the layers. The insulating layer 190 is, for example, a substrate with a low dielectric constant. By integrating the BB circuit and the RF circuit with the insulating layer 190, the cost of manufacturing the antenna structure 100 of the embodiment may be saved.

As shown in FIG. 1, a thickness of the two uppermost insulating layers 190 is thicker than that of the other insulating layers 190, so that the distance between the first radiator 140 (not shown in FIG. 1, located between the uppermost insulating layer 190 and a second-tier insulating layer 190 counting from top to bottom) and the second radiator 150 is greater than the distance between the first radiator 140 and the first conducting layer 130. Such design helps to improve the efficiency of the antenna structure 100.

Figure 6:
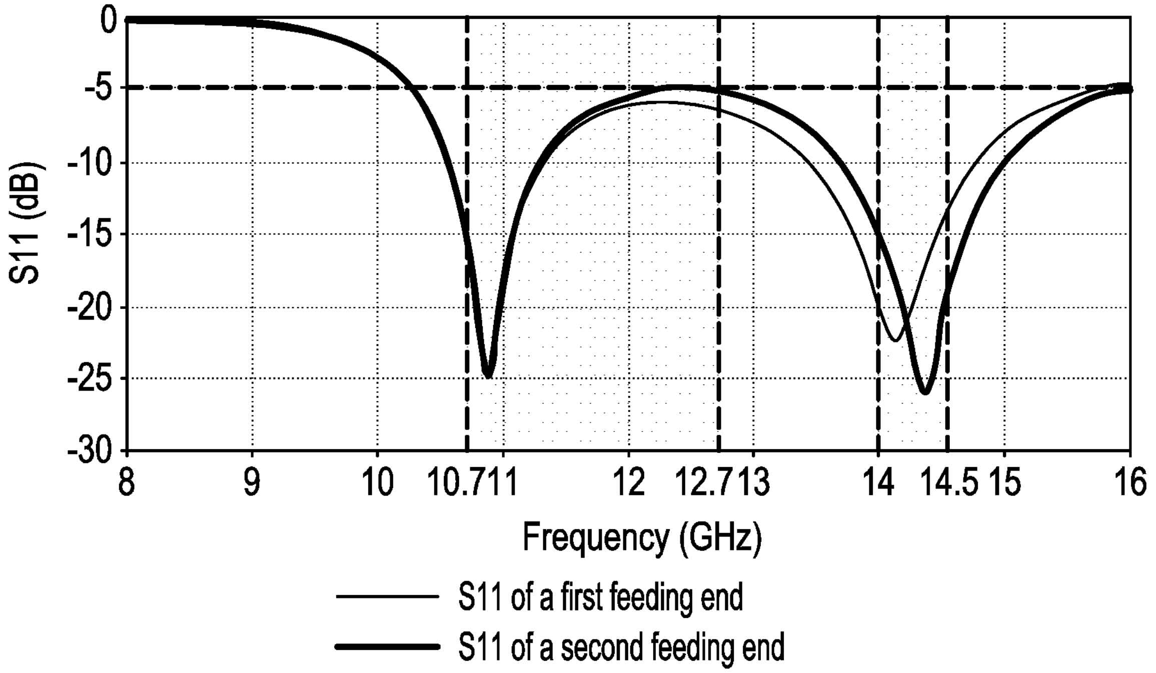
FIG. 6 is a diagram showing a relationship between frequency and S11 parameter of the antenna structure of FIG. 1.

FIG. 6 is a diagram showing a relationship between frequency and S11 parameter of the antenna structure of FIG. 1. Referring to FIG. 6, S11 parameter of the first frequency band (14 GHz to 14.5 GHz) and the second frequency band (10.7 GHz to 12.7 GHz) excited by the antenna structure 100 of the embodiment are both less than −5 dB. Namely, both of the first frequency band and the second frequency band excited by the antenna structure 100 of the embodiment have good performance.

Figure 7:
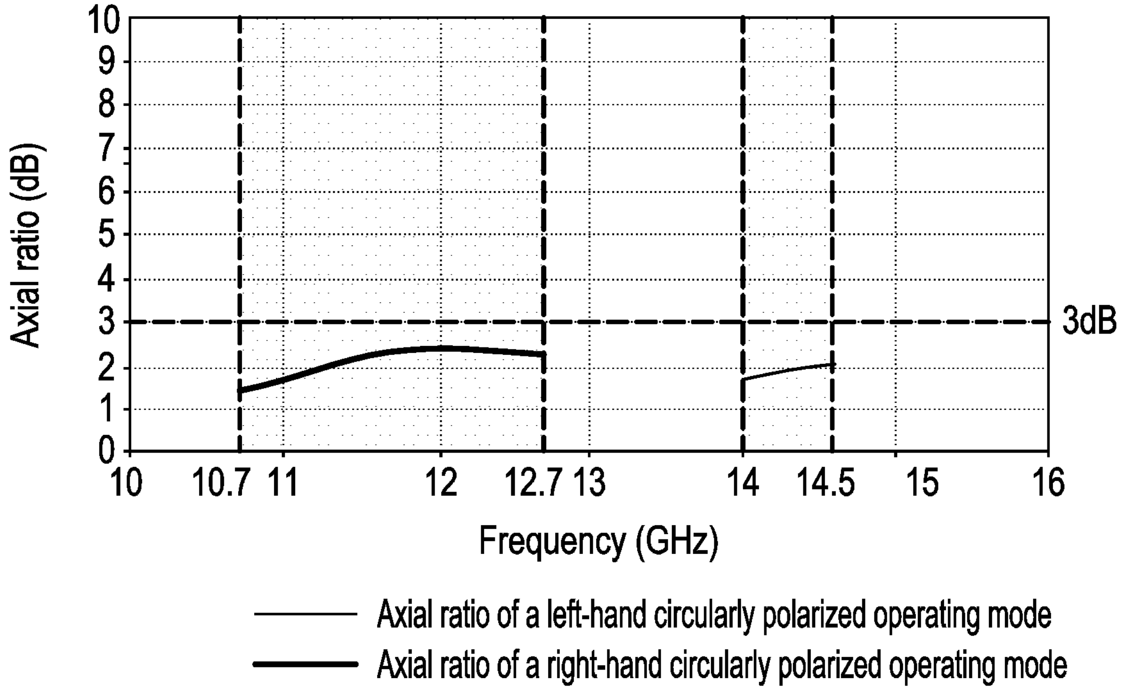
FIG. 7 is a diagram showing a relationship between frequency and axial ratios of the antenna structure of FIG. 1.

FIG. 7 is a diagram showing a relationship between frequency and axial ratios of the antenna structure of FIG. 1. Referring to FIG. 7, the axial ratios corresponding to the first frequency band (14 GHz to 14.5 GHz) and the second frequency band (10.7 GHz to 12.7 GHz) excited by the antenna structure 100 of the embodiment are both less than 3 dB. Namely, electromagnetic wave field patterns of the first frequency band and the second frequency band excited by the antenna structure 100 of the embodiment have characteristics of circular polarization.

Figure 8A:
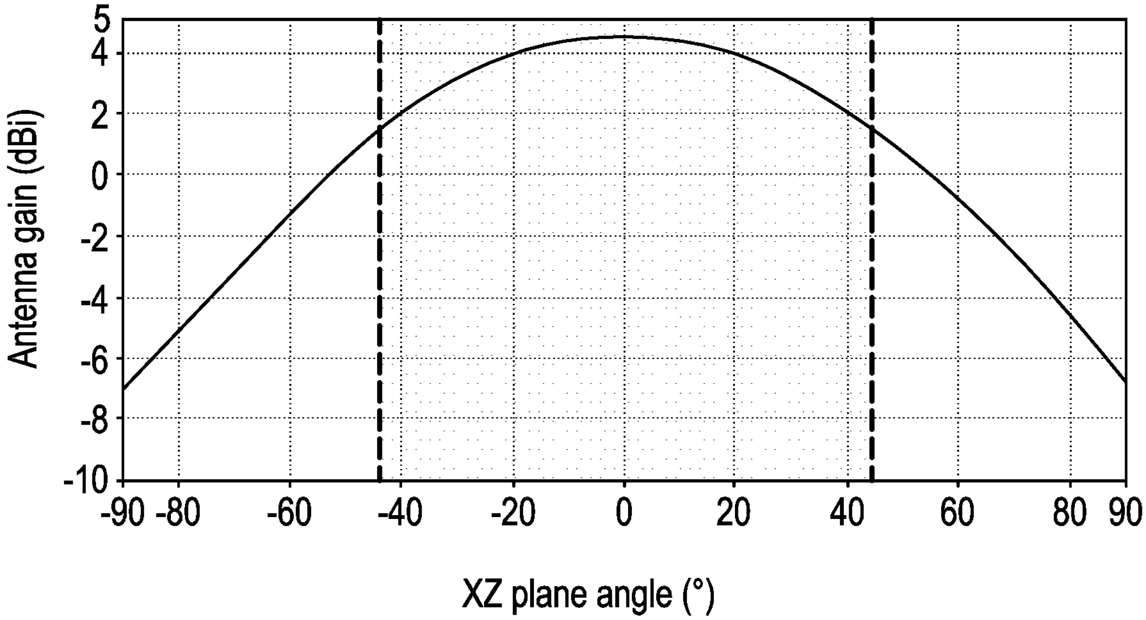
FIG. 8A and FIG. 8B are respectively diagrams showing a relationship between XZ plane angle and antenna gain of the antenna structure of FIG. 1 at operating frequencies of 11.7 GHz and 14.2 GHz respectively.
Figure 8B:
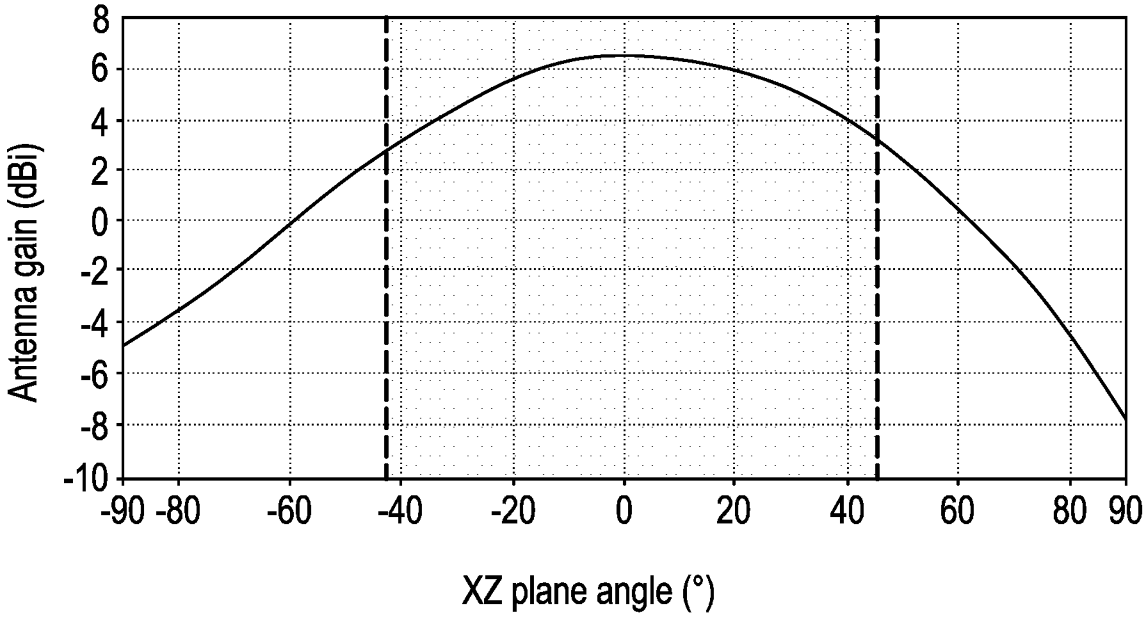

FIG. 8A and FIG. 8B are respectively diagrams showing a relationship between XZ plane angle and antenna gain of the antenna structure of FIG. 1 at operating frequencies of 11.7 GHz and 14.2 GHz respectively. Referring to FIG. 8A, under the operating frequency of 11.7 GHz (within the second frequency band), the maximum gain is 4.52 dBi, and a 3 dB beam width is 88.5 degrees. Referring to FIG. 8B, under the operating frequency of 14.2 GHz (within the first frequency band), the maximum gain is 6.45 dBi and the 3 dB beam width is 80.7 degrees. Namely, the antenna structure 100 of the embodiment has good performance when exciting the first frequency band and the second frequency band.

Figure 9:
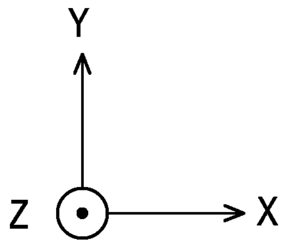
FIG. 9 is a schematic diagram of an antenna array according to an embodiment of the invention.
Figure 9:
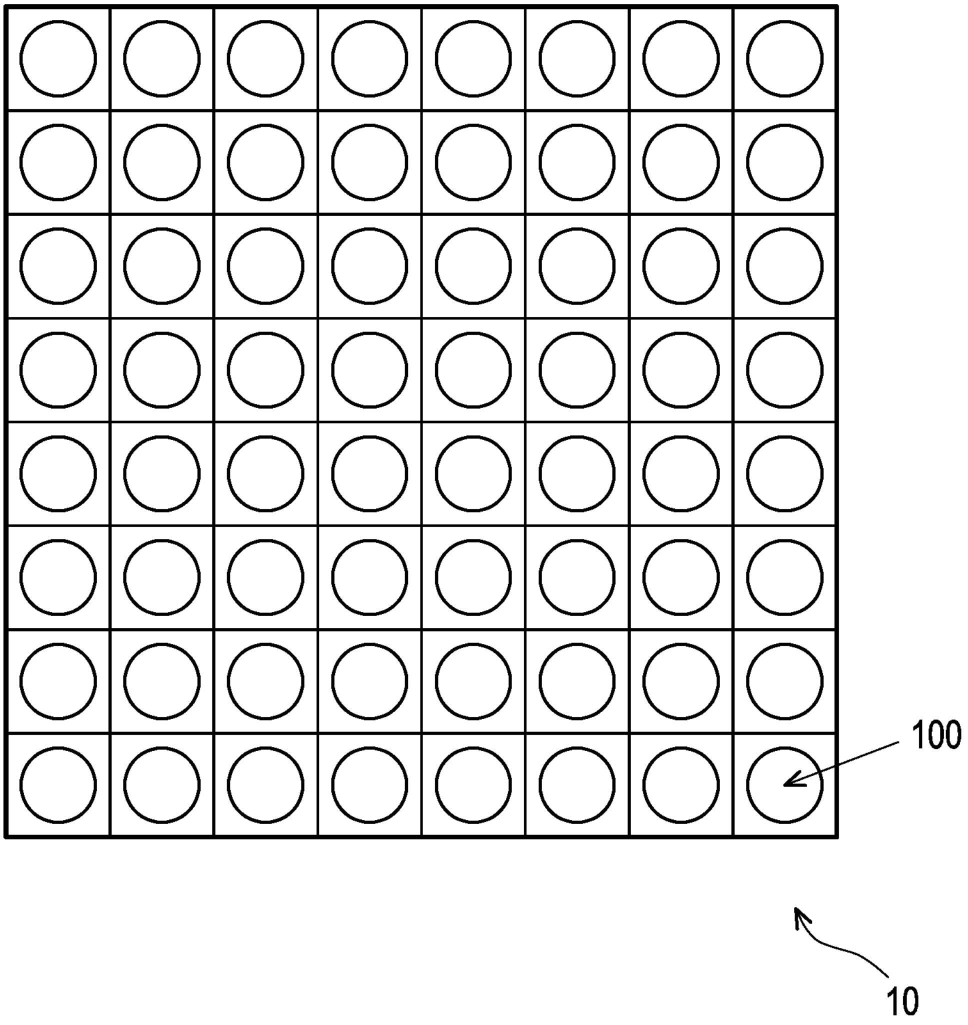

FIG. 9 is a schematic diagram of an antenna array according to an embodiment of the invention. Referring to FIG. 9, an antenna array 10 of the embodiment is composed of a plurality of the aforementioned antenna structures 100 arranged in an array. The antenna array 10 shown in FIG. 9 is composed of 8×8 antenna structures 100, but in other embodiments, it may also be composed of 4×4 antenna structures 100, 16×16 antenna structures 100, or the antenna structures 100 with other arrangements, which is not limited by the invention.

In addition, although the respective antenna structures 100 are arranged side by side in the antenna array 10, since each antenna structure 100 has the outer ring conductive via group 185, signal interference between the respective antenna structures 100 may be prevented.

In summary, the first slot and the second slot of the antenna structure of the invention correspond to the first microstrip line and the second microstrip line, the main extending direction of the first slot is perpendicular to the extending direction of the first microstrip line. The main extending direction of the second slot is perpendicular to the extending direction of the second microstrip line. When the first feeding end and the second feeding end are respectively fed with signals of the first phase and the second phase, and the phase difference between the first phase and the second phase is 90 degrees, the first electromagnetic energy is coupled to the first slot and the second slot respectively through the first microstrip line and the second microstrip line, and then coupled to the first radiator so as to generate the first frequency band of the left-hand circularly polarized operating mode. When the first feeding end and the second feeding end are fed with signals of the second phase and the first phase respectively, the second electromagnetic energy is coupled to the first slot and the second slot respectively through the first microstrip line and the second microstrip line, and then coupled to the second radiator so as to generate the second frequency band of the right-hand circularly polarized operating mode.

In addition, the diameter of the first radiator is one-half wavelength of the first frequency band, the diameter of the second radiator is one-half wavelength of the second frequency band, and the size of the second radiator is larger than the size of the first radiator. The side length of each of the first grounding layer, the second conducting layer and the first conducting layer needs to be less than the one-half wavelength of the first frequency band. The perimeter of each of the first slot and the second slot is an integer multiple of the one-half wavelength of the first frequency band or the second frequency band, and the perimeter of the first hollow region of the second conducting layer is an integer multiple of the one-half wavelength of the first frequency band or the second frequency band. Through such design, the antenna structure of the invention may provide good circular polarization performance and may be applied to low-orbit satellite communications, and the excited first and second frequency bands have good performance.

What is claimed is:

1. An antenna structure, comprising:

a first grounding layer;

a microstrip line group, disposed above the first grounding layer, and comprising a first microstrip line and a second microstrip line that are perpendicular to each other, wherein the first microstrip line comprises a first feeding end, and the second microstrip line comprises a second feeding end;

a first conducting layer, disposed above the microstrip line group, and comprising a first slot and a second slot that are perpendicular to each other, wherein the first slot and the second slot correspond to the first microstrip line and the second microstrip line respectively, a main extending direction of the first slot is perpendicular to an extending direction of the first microstrip line, and a main extending direction of the second slot is perpendicular to an extending direction of the second microstrip line;

a first radiator, disposed above the first slot and the second slot;

a second radiator, disposed above the first radiator; and a second conducting layer coplanar with the microstrip line group, wherein the second conducting layer comprises a first hollow region, the microstrip line group is located in the first hollow region, and a perimeter of the first hollow region is an integer multiple of a one-half wavelength of the first frequency band or the second frequency band, wherein when the first feeding end is fed with a signal of a first phase, the second feeding end is fed with a signal of a second phase, and a phase difference between the first phase and the second phase is 90 degrees, first electromagnetic energy is coupled to the first slot and the second slot respectively through the first microstrip line and the second microstrip line, and then to the first radiator so as to generate a first frequency band of a left-hand circularly polarized operating mode, when the first feeding end is fed with the signal of the second phase and the second feeding end is fed with the signal of the first phase, second electromagnetic energy is coupled to the first slot and the second slot respectively through the first microstrip line and the second microstrip line, and then to the second radiator so as to generate a second frequency band of a right-hand circularly polarized operating mode.

2. The antenna structure as claimed in claim 1, wherein the first radiator and the second radiator are formed with two round shapes, a diameter of the first radiator is a one-half wavelength of the first frequency band, and a diameter of the second radiator is a one-half wavelength of the second frequency band.

3. The antenna structure as claimed in claim 1, wherein each of the first radiator and the second radiator is a round shape, an elliptical shape or a polygonal shape, and a size of the second radiator is larger than that of the first radiator.

4. The antenna structure as claimed in claim 1, wherein each of the first slot and the second slot comprises a main slot and two branch slots extending from two opposite ends of the main slot, and each branch slot is in a V-shape, and a tip of the V-shape is connected to the main slot.

5. The antenna structure as claimed in claim 1, wherein a perimeter of each of the first slot and the second slot is an integer multiple of a one-half wavelength of the first frequency band or the second frequency band.

6. The antenna structure as claimed in claim 1, wherein the first grounding layer, the second conducting layer and the first conducting layer are connected to each other through an inner ring conductive via group, the inner ring conductive via group is located at a periphery of the first hollow region and surrounds the first slot and the second slot.

7. The antenna structure as claimed in claim 1, wherein the first grounding layer, the second conducting layer and the first conducting layer are connected to each other through an outer ring conductive via group, the outer ring conductive via group is located at edges of the first grounding layer, the second conducting layer and the first conducting layer.

8. The antenna structure as claimed in claim 1, wherein a side length of each of the first grounding layer, the second conducting layer and the first conducting layer is less than the one-half wavelength of the first frequency band.

9. The antenna structure as claimed in claim 1, further comprising a third conducting layer located between the second conducting layer and the first conducting layer, wherein the third conducting layer comprises a second hollow region corresponding to the first hollow region, and a perimeter of the second hollow region is an integer multiple of the one-half wavelength of the first frequency band or the second frequency band.

10. The antenna structure as claimed in claim 9, wherein each of the first hollow region and the second hollow region comprises a first portion and a second portion perpendicular to each other and presenting a T-shape, the first microstrip line is located in the first portion of the first hollow region, and the second microstrip line is located in the second portion of the first hollow region, the extending direction of the first microstrip line is perpendicular to an extending direction of the first portion, and the extending direction of the second microstrip line is perpendicular to an extending direction of the second portion.

11. The antenna structure as claimed in claim 1, further comprising a second grounding layer, wherein the first grounding layer is located between the second grounding layer and the microstrip line group.

12. The antenna structure as claimed in claim 1, wherein the first frequency band is between 14 GHz and 14.5 GHz, and the second frequency band is between 10.7 GHz and 12.7 GHz.

13. An antenna array, comprising:

the plurality of antenna structures as claimed in claim 1, arranged in an array.

* * * * *